(12) United States Patent
Kaneko

(10) Patent No.: US 8,223,369 B2
(45) Date of Patent: Jul. 17, 2012

(54) INFORMATION PROCESSING APPARATUS, INFORMATION PROCESSING SYSTEM AND COMPUTER READABLE MEDIUM

(75) Inventor: Hiroyuki Kaneko, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 855 days.

(21) Appl. No.: 12/272,854

(22) Filed: Nov. 18, 2008

(65) Prior Publication Data

US 2009/0310163 A1 Dec. 17, 2009

(30) Foreign Application Priority Data

Jun. 13, 2008 (JP) ................. 2008-156038

(51) Int. Cl.
*G06F 15/00* (2006.01)
*G06F 15/16* (2006.01)

(52) U.S. Cl. ...................... 358/1.15; 709/217

(58) Field of Classification Search .......... 358/1.15, 358/1.13, 1.14, 1.12, 1.16, 1.18, 1.1; 709/205, 709/226, 218, 217; 382/101; 715/770, 273, 715/255, 752

See application file for complete search history.

(56) References Cited

U.S. PATENT DOCUMENTS

2002/0194274 A1* 12/2002 Kroeger .................. 709/205

FOREIGN PATENT DOCUMENTS

| JP | 09-138823 A | 5/1997 |
| JP | 2001-319019 A | 11/2001 |
| JP | 2002-165076 A | 6/2002 |
| JP | 2003-348284 A | 12/2003 |
| JP | 2007-114036 A | 5/2007 |
| JP | 2007-200136 A | 8/2007 |
| JP | 2008-077238 A | 4/2008 |

OTHER PUBLICATIONS

Japanese Office Action issued for Application No. 2008-156038, dated Jan. 26, 2010.

\* cited by examiner

*Primary Examiner* — Saeid Ebrahimi Dehkordy

(74) *Attorney, Agent, or Firm* — Sughrue Mion, PLLC

(57) ABSTRACT

An information processing apparatus includes a document information storage unit, a progress information identification unit and a progress information storage unit. The document information storage unit stores identification information of a paper document associated with an operation item defined for a case. The progress information identification unit obtains progress information indicating a progress of the operation item based on the paper document identified by the identification information associated with the operation item. The progress information storage unit stores the progress information obtained by the progress information identification unit associated with the operation item.

8 Claims, 10 Drawing Sheets

*FIG. 2*

| DOCUMENT ID | DOCUMENT NAME | DOCUMENT DATA | REGISTRATION DATE |
|---|---|---|---|
| 0001 | ESTIMATE REQUEST DOCUMENT | D0001 | 2008/2/20 |
| 0002 | ESTIMATE REPLY DOCUMENT | D0002 | 2008/2/24 |
| 0003 | ORDER DOCUMENT | D0003 | 2008/2/24 |
| | | | |

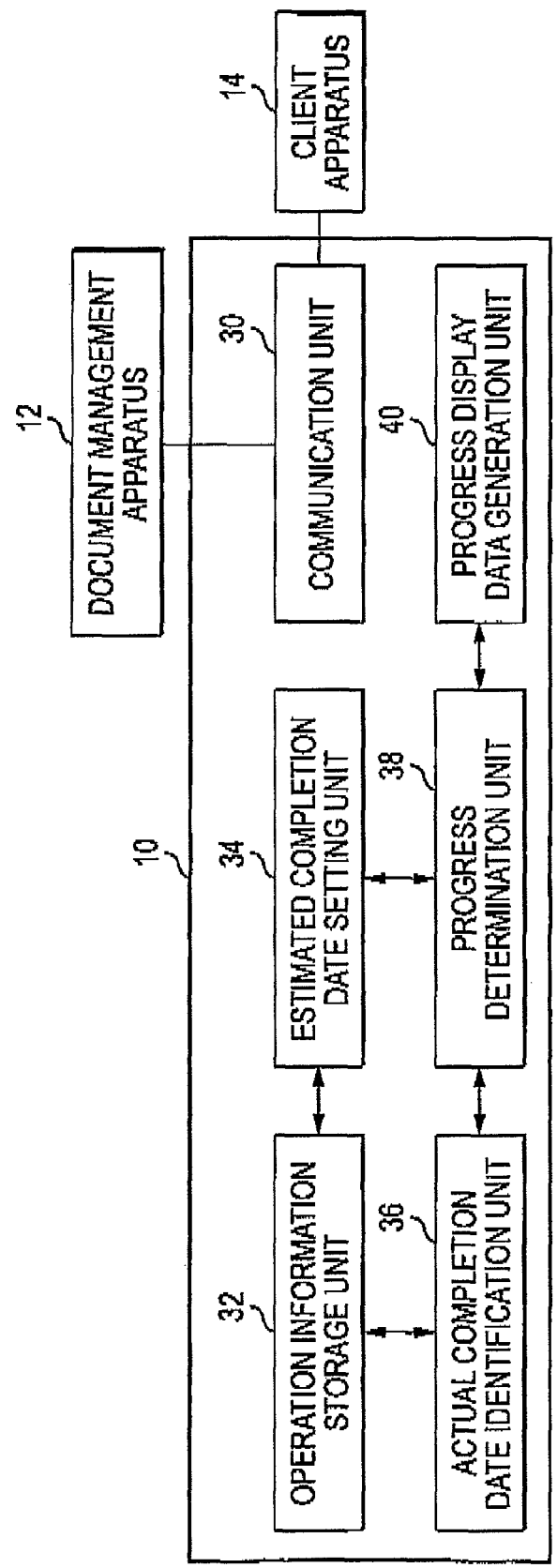

FIG. 5

| OPERATION NAME | ORDER | PROCESSING DEPARTMENT | CONTENTS |
|---|---|---|---|
| ESTIMATE REQUEST | 1 | PROCUREMENT DEPARTMENT | "ESTIMATE REQUEST DOCUMENT" IS SENT FROM PROCUREMENT DEPARTMENT TO SUBCONTRACTOR FOR REQUESTING ESTIMATE "DESIRED DELIVERY DATE" IS WRITTEN IN "ESTIMATE REQUEST DOCUMENT" |
| ESTIMATE REPLY | 2 | SUBCONTRACTOR | "ESTIMATE REPLY DOCUMENT" IS RETURNED FROM SUBCONTRACTOR TO PROCUREMENT DEPARTMENT |
| ORDER | 3 | PROCUREMENT DEPARTMENT | "ORDER DOCUMENT" IS SENT FROM PROCUREMENT DEPARTMENT TO SUBCONTRACTOR FOR PLACING ORDER |
| SUPPLY | 4 | WAREHOUSE DEPARTMENT | SUBCONTRACTOR HAVING RECEIVED ORDER IS SUPPLIED WITH NECESSARY PARTS FROM WAREHOUSE DEPARTMENT, AND RECEIVES "MATERIAL SUPPLY DOCUMENT" AT THE SAME TIME |
| ESTIMATED DELIVERY DATE REPLY | 5 | SUBCONTRACTOR | SUBCONTRACTOR HAVING RECEIVED MATERIALS NOTIFIES TO PROCUREMENT DEPARTMENT AS TO EXPECTED DELIVERY DATE OF PRODUCTS TO BE MANUFACTURED, BY "ESTIMATED DELIVERY DATE REPLY DOCUMENT" "ESTIMATED DELIVERY DATE" IS WRITTEN IN "ESTIMATED DELIVERY DATE REPLY DOCUMENT" |
| DELIVER | 6 | SUBCONTRACTOR | COMPLETED PRODUCTS ARE DELIVERED TO MANUFACTURING DEPARTMENT, AND "DELIVERY STATEMENT DOCUMENT" IS DELIVERED AT THE SAME TIME |

FIG. 6

| OPERATION NAME | DOCUMENT NAME | ESTIMATE REQUEST DOCUMENT | ESTIMATE REPLY DOCUMENT | ORDER DOCUMENT | MATERIAL SUPPLY DOCUMENT | ESTIMATED DELIVERY DATE REPLY DOCUMENT | DELIVERY DOCUMENT |
|---|---|---|---|---|---|---|---|
| ESTIMATE REQUEST | ESTIMATED DATE | | | | | | |
| | ACTUAL DATE | ISSUE DATE | | | | | |
| ESTIMATE REPLY | ESTIMATED DATE | | | | | | |
| | ACTUAL DATE | | DOCUMENT REGISTRATION DATE | | | | |
| ORDER | ESTIMATED DATE | | | | | | |
| | ACTUAL DATE | | | ISSUE DATE | | | |
| SUPPLY | ESTIMATED DATE | | | | | | |
| | ACTUAL DATE | | | | ISSUE DATE | | |
| ESTIMATED DELIVERY DATE REPLY | ESTIMATED DATE | DESIRED DELIVERY DATE (WRITTEN IN DOCUMENT) | | | | | |
| | ACTUAL DATE | | | | | ESTIMATED DELIVERY DATE (WRITTEN IN DOCUMENT) | |
| DELIVERY | ESTIMATED DATE | DESIRED DELIVERY DATE (WRITTEN IN DOCUMENT) | | | | ESTIMATED DELIVERY DATE (WRITTEN IN DOCUMENT) | |
| | ACTUAL DATE | | | | | | ISSUE DATE |

FIG. 7

| OPERATION NAME | ESTIMATED DATE | ACTUAL DATE | DOCUMENT NAME | REGISTRATION DATE AND TIME |
|---|---|---|---|---|
| ESTIMATE REQUEST | | 2008/02/20 | ESTIMATE REQUEST DOCUMENT (1) | 2008/02/20 13:00 |
| ESTIMATE REPLY | | 2008/02/24 | ESTIMATE REPLY DOCUMENT | 2008/02/24 10:05 |
| ORDER | | 2008/02/24 | ORDER DOCUMENT | 2008/02/24 14:10 |
| SUPPLY | | 2008/02/25 | MATERIAL SUPPLY DOCUMENT | 2008/02/25 16:00 |
| ESTIMATED DELIVERY DATE REPLY | 2008/03/15 | | ESTIMATE REQUEST DOCUMENT (*1) | 2008/02/20 13:00 |
| ESTIMATED DELIVERY DATE REPLY | 2008/03/18 | 2008/03/18 | ESTIMATED DELIVERY DATE REPLY DOCUMENT (2) | 2008/02/28 14:21 |
| ESTIMATED DELIVERY DATE REPLY | 2008/03/20 | 2008/03/20 | ESTIMATED DELIVERY DATE REPLY DOCUMENT (3) | 2008/03/10 10:30 |
| DELIVERY | 2008/03/15 | | ESTIMATE REQUEST DOCUMENT (*1) | 2008/02/20 13:00 |
| DELIVERY | 2008/03/18 | | ESTIMATED DELIVERY DATE REPLY DOCUMENT (*2) | 2008/02/28 14:21 |
| DELIVERY | 2008/03/20 | | ESTIMATED DELIVERY DATE REPLY DOCUMENT (*3) | 2008/03/10 10:30 |

FIG. 8

PROGRESS DISPLAY SCREEN

AS OF 08/3/17

| CASE | | ESTIMATE REQUEST | ESTIMATE REPLY | ORDER | SUPPLY | ESTIMATED DELIVERY DATE REPLY | DELIVERY |
|---|---|---|---|---|---|---|---|
| Y2002 | ESTIMATED DATE | | | | | 08/2/20 | 08/2/18 |
| | COMPLETION DATE | 08/2/4 | 08/2/7 | 08/2/7 | 08/2/8 | 08/2/18 | 08/2/18 |
| Y2011 | ESTIMATED DATE | | | | | 08/3/1 | 08/3/1 |
| | COMPLETION DATE | 08/2/16 | 08/2/18 | 08/2/18 | 08/2/18 | | |
| Y2022 | ESTIMATED DATE | | | | | 08/3/10 | 08/3/10 |
| | COMPLETION DATE | 08/2/18 | 08/2/22 | 08/2/23 | 08/2/25 | 08/3/10 | 08/3/15 |
| Y2100 | ESTIMATED DATE | | | | | 08/3/15 | 08/3/20 |
| | COMPLETION DATE | 08/2/20 | 08/2/24 | 08/2/24 | 08/2/25 | 08/3/20 | |

FIG. 9

PROGRESS DISPLAY SCREEN

| BASIC ATTRIBUTE | CASE | SUBCONTRACTOR | SUBCONTRACTOR NAME | PART | MODEL CODE |
|---|---|---|---|---|---|
| | Y2100 | 3245 | ABCcom | BV24 | RF-36 |

| ESTIMATE REQUEST | ESTIMATE REPLY | ORDER | SUPPLY | ESTIMATED DELIVERY DATE REPLY | DELIVERY |

| DOCUMENT NAME | ESTIMATED DATE | ACTUAL DATE | REGISTRATION DATE AND TIME |
|---|---|---|---|
| ESTIMATE REQUEST DOCUMENT | 2008/3/15 | | 2008/2/20 13:00 |
| ESTIMATED DELIVERY DATE REPLY DOCUMENT | | 2008/3/18 | 2008/2/28 14:21 |
| ESTIMATED DELIVERY DATE REPLY DOCUMENT | | 2008/3/20 | 2008/3/10 10:30 |

INFORMATION PROCESSING APPARATUS, INFORMATION PROCESSING SYSTEM AND COMPUTER READABLE MEDIUM

CROSS-REFERENCE TO RELATED APPLICATIONS

This application is based on and claims priority under 35 USC 119 from Japanese Patent Application No. 2008-156038 filed Jun. 13, 2008.

BACKGROUND

1. Technical Field

The present invention relates to an information processing apparatus, an information processing system, and a computer readable medium.

2. Related Art

In order to efficiently perform operations, it is performed to convert information related to operations into electronic form for management.

SUMMARY

According to an aspect of the invention, an information processing apparatus includes a document information storage unit, a progress information identification unit and a progress information storage unit. The document information storage unit stores identification information of a paper document associated with an operation item defined for a case. The progress information identification unit obtains progress information indicating a progress of the operation item based on the paper document identified by the identification information associated with the operation item. The progress information storage unit stores the progress information obtained by the progress information identification unit associated with the operation item.

BRIEF DESCRIPTION OF THE DRAWINGS

Exemplary embodiment(s) of the present invention will be described in detail based on the following figures, wherein:

FIG. 2 is a view showing an example of table data of documents managed by a document management apparatus.

FIG. 4 is a block diagram of the functions of a operation management apparatus according to the present exemplary embodiment;

FIG. 5 is a view showing an example of an operation definition table;

FIG. 6 is a view showing an example of an operation progress definition table;

FIG. 7 is a view showing an example of an operation progress management table;

FIG. 8 is a view showing an example of an progress display screen;

FIG. 9 is a view showing an example of the progress display screen; and

DETAILED DESCRIPTION

Hereinafter, an exemplary embodiment for carrying out the present invention will be described with reference to the drawings.

Figure 1:
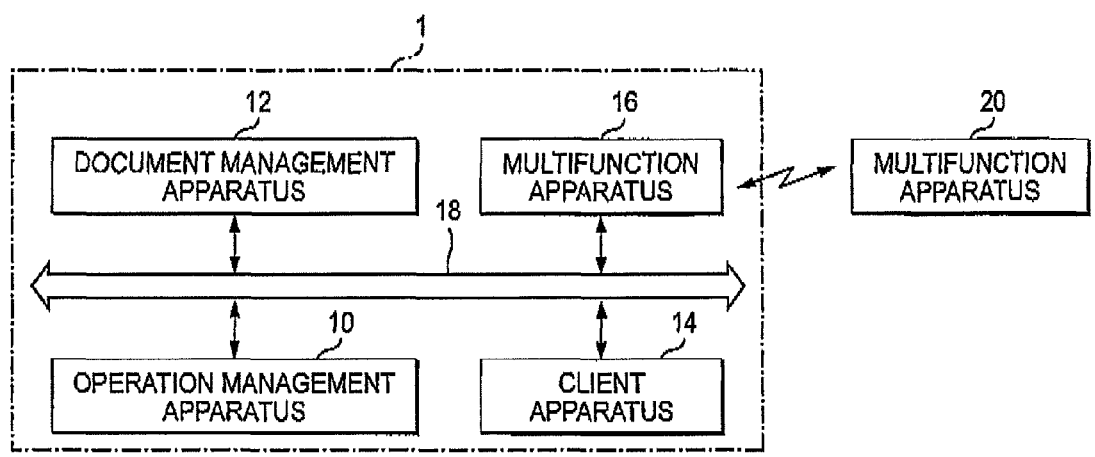
FIG. 1 is a system configuration diagram of a operation management system according to the present exemplary embodiment.

FIG. 1 is a system configuration diagram of an operation management system 1 according to the present exemplary embodiment. As shown in FIG. 1, the operation management system 1 includes an operation management apparatus 10, a document management apparatus 12, a client apparatus 14, and a multifunction apparatus 16. These apparatuses are connected to communicate each other through a local area network 18 (LAN).

The multifunction apparatus 16 is a multifunction printer having plural functions such as a FAX function, a printer function, and a copy function. For example, the multifunction apparatus 16 transmits, using the FAX function, a paper document set by the user to a multifunction apparatus 20 of a specified subcontractor. Here, the paper document describes the contents of an operation such as a request of an operation. And the multifunction receives, using the FAX function, a document such as a delivery document transmitted from the multifunction apparatus 20 of a subcontractor.

The client apparatus 14, which is a terminal apparatus operated by the user, produces various documents related to operations, registers the produced documents in the document management apparatus 12 described later, and accesses the operation management apparatus 10 also described later to display the progress of operations managed by the operation management apparatus 10 on the client apparatus 14.

The document management apparatus 12 is an apparatus that stores and collectively manages documents of various forms such as paper documents and electronic documents. For example, the documents transmitted and received by fax by the multifunction apparatus and the documents produced by the client apparatus 14 are all registered in the document management apparatus 12 so that the document management apparatus 12 can collectively manage documents of all the forms produced, transmitted, and received in the operation management system 1.

FIG. 2 shows an example of table data (a document management table) of documents managed by the document management apparatus 12. As shown in FIG. 2, the document management table includes one or plural records where the document ID, the document name, the document data, and the document registration date (may include the time) are associated with one another. The document data may be used as it is in the original data format when the registered document is application data of a word processor, an editor or the like. Also, the document data may be image data in the bitmap format, the JPEG format; or the like where these electronic documents are developed into images. When a paper document is registered, image data obtained by scanning the paper document may be used. The document registration date is the date when the document is registered in the document management apparatus 12. When the same document is registered plural number of times, only the latest registration date may be recorded or the whole history thereof may be recorded.

The operation management apparatus 10 is an apparatus that manages, for one or plural operation processes defined for a case, the progress of the respective operation processes and the progress of the entire case. In the present exemplary embodiment, a process of outsourcing a part for manufacturing a product will be described as an example of the operation process to be managed. The outsourcing process includes plural processes such as initiating an order, placing an order with a subcontractor, and receiving delivery from the subcontractor. A concrete example thereof will be described by using FIG. 3.

Figure 3:
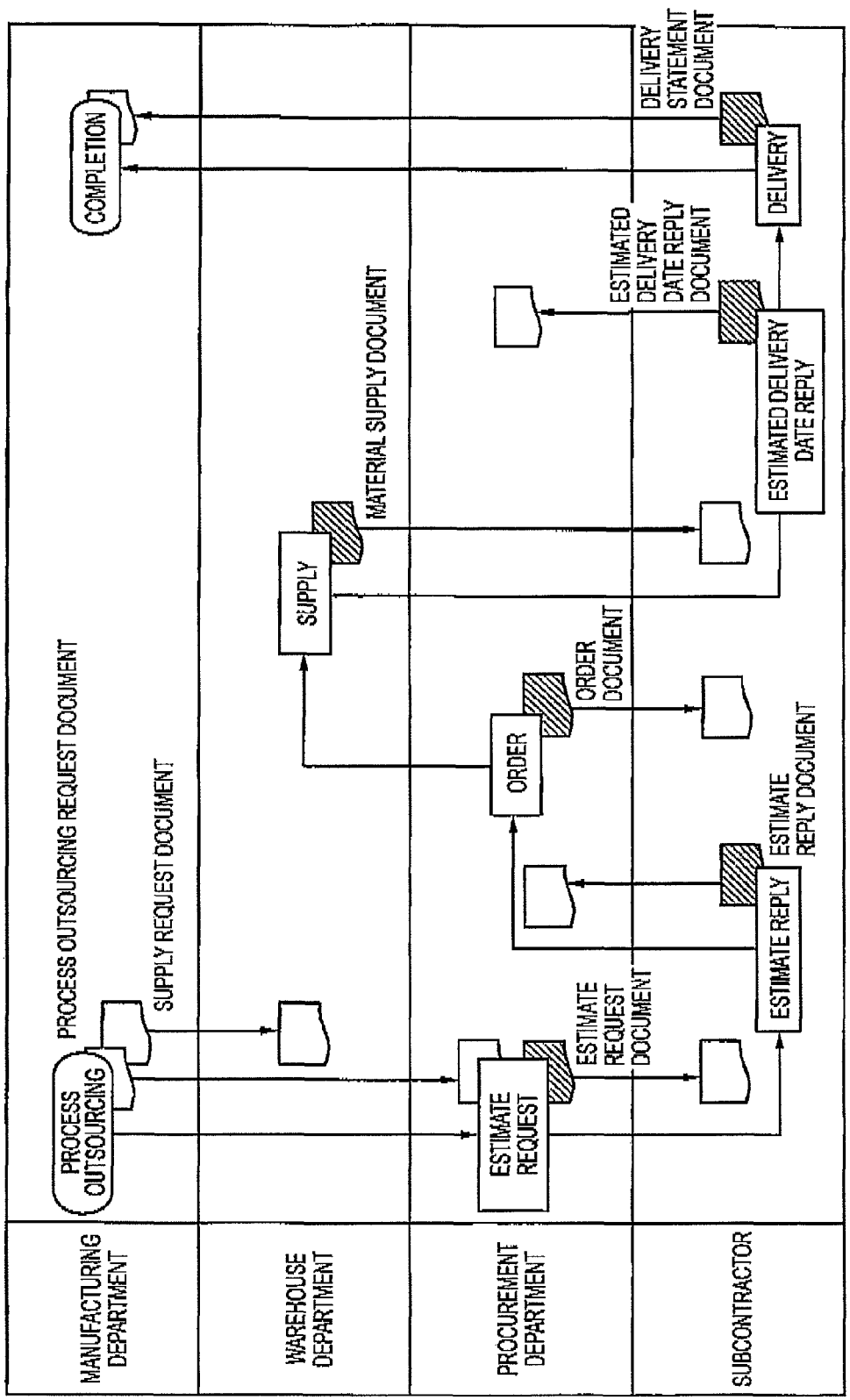
FIG. 3 is an operation flowchart.

FIG. 3 is an operation flowchart showing an example of plural operations defined for an outsourcing case to order a part from a subcontractor and the connection among the operations. As shown in FIG. 3, the outsourcing case includes operation processes of estimate request, estimate reply, order, supply, estimated delivery date reply, and delivery. These operation processes are each associated with a document corresponding to the contents of the operation. For example, in the operation process of estimate request, a process outsourcing request document produced at the start of the outsourcing process is registered, thereafter, an estimate request document corresponding to the contents of the process outsourcing request document is produced, and the process is handed over to the next process (the process of estimate reply to the subcontractor). There are cases where the forms of the documents associated with these operations cannot be made uniform because of various factors such as an agreement with the subcontractor, the presence or absence of communication equipment, security, and customs. And the forms of documents used may be electronic documents in some cases and paper documents in other cases. Therefore, the operation management apparatus 10 of the present exemplary embodiment collectively manages the progress of the entire outsourcing case even when request documents, reply documents, report documents, and the like are exchanged in the electronic document form and the paper document form in the above-mentioned operation processes. Functions of the operation management apparatus 10 will be described in detail to grasp the progress of the operations at any time even when all or some of the operation processes include communications through paper documents.

FIG. 4 is a block diagram of the functions of the operation management apparatus 10 according to the present exemplary embodiment. As shown in FIG. 4, the operation management apparatus 10 includes a communication unit 30, an operation information storage unit 32, an estimated completion date setting unit 34, an actual completion date identification unit 36, a progress determination unit 38, and a progress display data generation unit 40. The functions of these units may be implemented as follows: A program stored in a computer-readable information storage medium is read into the operation management apparatus 10 which is a computer system by using a non-illustrated medium reader, and a CPU provided in the operation management apparatus 10 operates according to the instructions of the program stored in the memory. While the program is supplied to the operation management apparatus 10 through an information storage medium in this example, it may be downloaded into the operation management apparatus 10 from a remote location through a data communication network such as the Internet.

The communication unit 30 is connected to the local area network 18, and performs data communication with another information processing apparatus such as the document management apparatus 12, the client apparatus 14, and the multifunction apparatus 16 connected to the local area network 18. For example, the operation management apparatus 10 accesses the document management apparatus 12 through the communication unit 30 to obtain document information and the document data registered in the document management apparatus 12. And when receiving a viewing request for a progress management screen of a case from the client apparatus 14, the operation management apparatus 10 transmits, to the client apparatus 14, progress display data generated for the case corresponding to the received request. Details of these processes will be described later.

The operation information storage unit 32 includes a storage device such as a semiconductor memory or a magnetic disk drive, and stores various-pieces of data related to operation information. The pieces of data related to operation information include operation definition information and information indicating statuses of the progress. The pieces of data related to operation information will be described with reference to an example.

FIG. 5 shows an example of an operation definition table stored in the operation information storage unit 32. The operation definition table includes information that clarifies the operations constituting a case and shows the concrete contents of the operations. As shown in FIG. 5, in the present exemplary embodiment, (i) the names of the operations specifying an outsourcing case, (ii) the order in which the operations are processed, (iii) the departments that process the operations and (iv) the concrete contents of the operations are stored so as to be associated with one another in the operation definition table.

FIG. 6 shows an example of an operation progress definition table stored in the operation information storage unit 32. In the present exemplary embodiment, the progress of operations is managed based on the estimated completion dates and the actual completion dates of the operations, and the operation progress definition table indicates which information the estimated completion date and the actual completion date of each operation are decided based on. In the present exemplary embodiment, as shown in FIG. 6, the operation progress definition table shows which information of a document the estimated date and the actual date of each operation in association with the operation are decided based on. For example, in the operation of "estimate request", the "issue date" of the "estimate request document" is determined as the "actual date" thereof. And in the operation of "estimated delivery date reply", the "desired delivery date" written in the "estimate request document" is determined as the "estimated date". And the "estimated delivery date" written in the "estimated delivery date reply document" is determined as the "actual date".

The estimated completion date setting unit 34 identifies the estimated completion date for each operation with reference to the operation progress definition table stored in the operation information storage unit 32, and stores the identified estimated completion date into an operation progress management table described later. For example, the estimated completion date setting unit 34 may extract the "desired delivery date" written in the "estimate request document" by character recognition processing based on the "estimate request document" as mentioned above. And the estimated completion date setting unit 34 may set the estimated completion date of the estimated delivery date reply based on the extracted text information. When plural documents having the same name are registered, the estimated date may be set based on the latest one of the documents. The estimated completion date setting unit 34 may set the estimated date based on a user input.

The actual completion date identification unit 36 identifies the actual completion date for each operation with reference to the operation progress definition table stored in the operation information storage unit 32, and stores the identified actual completion date in the operation progress management table described later. For example, for the operation of estimate request, the actual completion date identification unit 36 may extract the issue date of the "estimate request document" by character recognition processing and identify the actual date based on the extracted text information. For the operation of estimate reply, the actual completion date identification unit 36 may identify the actual date as the date when the "estimate reply document" is registered in the document management apparatus 12 (document registration date). When plural documents having the same name are registered, the actual date may be identified based on the latest one of the documents. The actual completion date identification unit 36 may identify the actual date based on the information that the user inputs based on the contents of the document.

FIG. 7 shows an example of the operation progress management table stored in the operation information storage unit 32. The operation progress management table is data storing date and time information obtained from each of the above-described estimated completion date setting unit 34 and actual completion date identification unit 36 for each operation. As shown in FIG. 7, in the present exemplary embodiment, for each operation, the estimated date and the actual date of the operation, the documents associated with the operation, and the registration dates and times of the documents are stored so as to be associated with one another in the operation progress management table. The documents marked with asterisks may be normal documents or may be reference to the documents of the numbers shown.

The progress determination unit 38 compares the estimated date and the actual date stored for each operation with reference to the operation progress management table stored in the operation information storage unit 32, and determines the progress of each operation. The progress determination unit 38 determines the progress, for each operation, based on whether the actual date is behind the estimated date or whether the actual date is not registered although the estimated date has passed.

The progress display data generation unit 40 generates progress display data to display the progress of each operation so as to be visualized, based on the result of the determination by the progress determination unit 38. The progress display data may be generated in various formats such as HTML, PDF, and a graphic image according to the environment of the client requiring viewing. An example of a progress display screen displayed based on the progress display data will be described with reference to FIGS. 8 and 9.

FIG. 8 shows an example of the progress display screen shown on a display of the client apparatus 14 having obtained the generated progress display data. The progress display screen in this example shows the progress of each case. The progress of each case is represented by the estimated completion date and the actual completion date of each of the operation processes of estimate request, estimate reply, order, supply, estimated delivery date reply, and delivery. A structure may be adopted in which for the uncompleted operation processes, only the estimated dates of the operations are displayed, for the operation processes where the actual completion date is behind the estimated completion date, the dates are displayed in a different color and for the operation processes that have not been performed yet although the estimated date has passed, the dates are highlighted so that the delay of the progress is apparent. When a case is specified, as shown in FIG. 9, detailed information on the specified case is shown.

FIG. 9 shows an example of the progress display screen showing detailed information on a case. As shown in FIG. 9, the progress display screen showing detailed information on a case includes a basic attribute display section showing basic attribute information of the case and detailed operation information display section showing detailed information on each operation process. In the detailed operation information display section, a tab is provided at the top of the display screen of each operation process, and by selecting a tab, details of the intended operation process can be displayed. In the detailed display of each operation process, the document name associated with the operation, the estimated date set for the operation, the actual date when the operation is actually performed, and the registration date and time when the document is registered in the document management apparatus 12 are stored.

Next, the flow of the operation progress management processing performed by the operation management apparatus 10 according to the present exemplary embodiment will be described with reference to the flowchart shown in FIG. 10.

Figure 10:
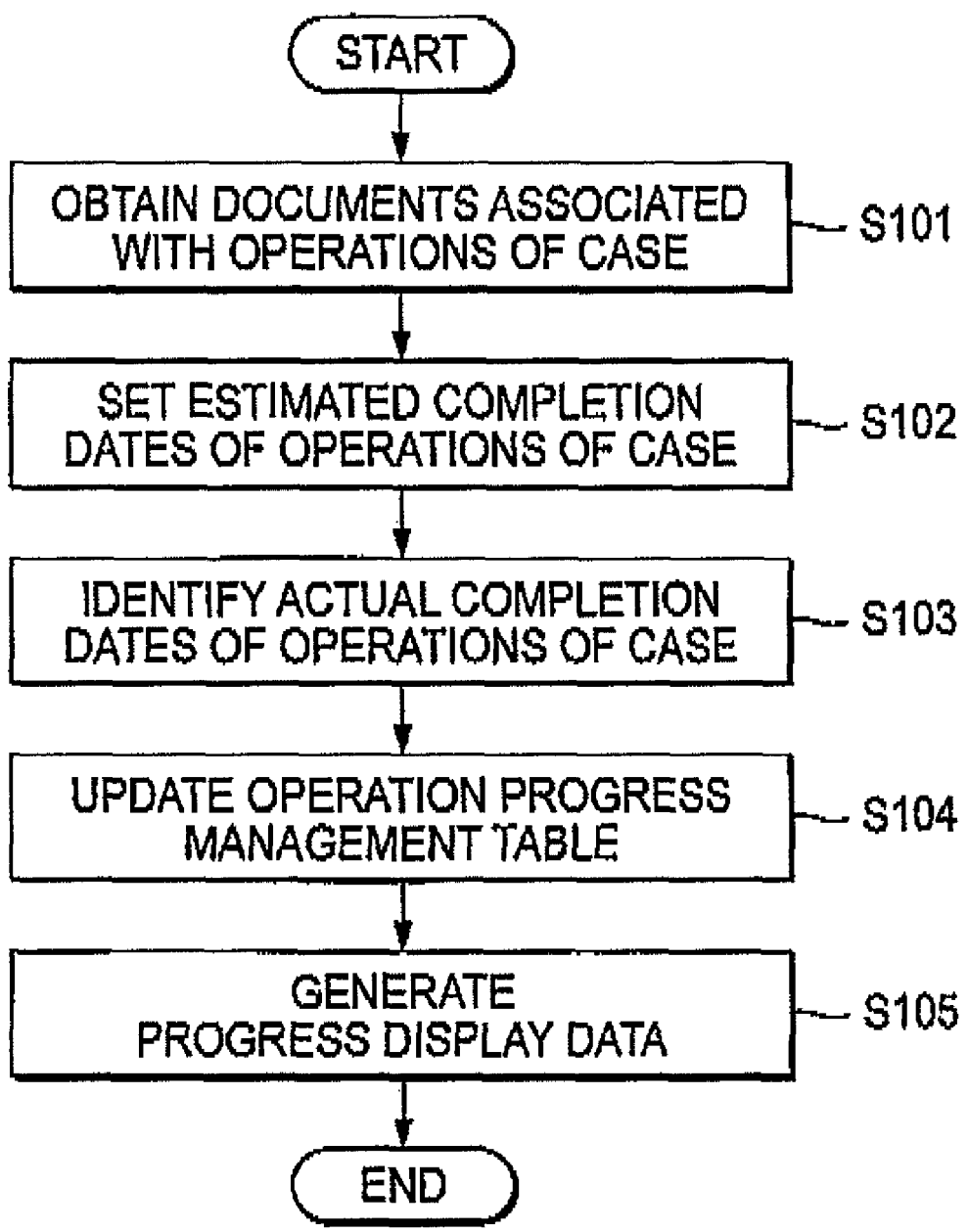
FIG. 10 is a flowchart of operation progress management processing.

As shown in FIG. 10, the operation management apparatus 10 accesses the document management apparatus 12 to obtain the documents registered so as to be associated with the specified case (S101), and associates each of the obtained documents with an operation. Then, the operation management apparatus 10 extracts the information on the documents associated with the operations, based on the operation definition table stored in the operation information storage unit 32, sets the estimated completion dates of the operations of the case (S102), and identifies the actual completion dates of the operations (S103). The set estimated completion date and the identified actual completion date are stored in the operation progress management table to update the operation progress management table (S104). The operation management apparatus 10 performs the above-described processing for all the operations defined for the case, and based on the operation progress management table obtained as a result thereof, generates progress display data representative of the progress of the operations for each case (S105).

When a progress check request specifying a case is made from the client apparatus 14 to the operation management apparatus 10, the operation management apparatus 10 reads the progress display data generated for the specified case, and transmits it to the client apparatus 14. The client apparatus 14 receives the display data from the operation management apparatus 10, and based on the received display data, displays a screen (FIG. 8, FIG. 9, etc.) showing the progress of the set operations for the case on the display. While previously created progress display data is transmitted to the client apparatus 14 in the above-described example, display data visualizing the progress for the case required by the client apparatus 14 may be generated and transmitted to the client apparatus 14 in response to a progress check request from the client apparatus 14.

The present invention is not limited to the above-described exemplary embodiment. The present invention is applicable not only to an outsourcing process related to product ordering but also to various other operation processes and is suitably applicable in an environment where paper documents and electronic documents coexist as communication means in performing operations.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a document information storage unit that stores identification information of a paper document, the paper document being a tangible record of an operation among a plurality of operations of a process, the document information storage unit storing an estimated completion date of the operation, electronic data of the paper document, and the identification information in association with each other in a database;

a progress information identification unit that scans the paper document and extracts from an image of the scanned paper document a completion date of the operation; and a progress information storage unit that stores the completion date of the operation obtained by the progress information identification unit in association with the operation and the estimated completion date in a database.

2. The information processing apparatus according to claim 1, further comprising:

a document registration unit that registers the paper document, wherein the progress information identification unit obtains the completion date of the operation based on a registration date of the paper document identified by the identification information, and the registration date indicates a date of registration by the document registration unit.

3. The information processing apparatus according to claim 1, further comprising:

a display control unit that displays, on a display apparatus, a progress display relating to the operation based on the stored estimated completion date and the stored completion date associated with the operation.

4. The information processing apparatus according to claim 1, wherein the process comprises a process of outsourcing a part for manufacturing a product comprising the steps of requesting an estimate, replying to the requested estimate, ordering the part, supplying the part, estimating a delivery date of the part, and delivering the part, wherein the operation comprises one of the requesting the estimate, the replying to the requested estimate, the ordering the part, the supplying the part, the estimating a delivery date of the part, and the delivering the part, and wherein the paper document comprises one of an estimate request document, an estimate reply document, an order document, a material supply document, an estimated delivery date reply document, and a delivery document.

5. An information processing system comprising:

an information processing apparatus including:

a document information storage unit that (i) stores identification information of a paper document, the paper document being a tangible record of an operation among a plurality of operations of a process and (ii) stores an estimated completion date of the operation, electronic data of the paper document, and the identification information in association with each other in a database;

a progress information identification unit that scans the paper document and extracts from an image of the scanned paper document an actual completion date of the operation; and a progress information storage unit that stores the stored estimated completion date and the actual completion in association with the operation in a database; and a display control apparatus that displays a progress display of the operation based on the stored estimated completion date and the stored actual completion date associated with the operation.

6. A non-transitory computer readable medium storing a program causing a computer to execute a process for managing operations, the process comprising:

storing identification information of a paper document, the paper document being a tangible record of an operation among a plurality of operations of a process, and storing an estimated completion date of the operation, electronic data of the paper document, and the identification information in association with each other in a database;

scanning the paper document and extracting from an image of the scanned paper document a completion date of the operation; and storing the obtained completion date of the operation in association with estimated completion date of the operation item in a database.

7. An information processing apparatus comprising:

an operation item management unit that manages an operation item for processing a case;

a document information storage unit that stores at least one document associated with the operation item;

a date extracting unit that extracts, for the operation item, an estimated completion date or a completion date from the at least one document based on a type of the at least one document; and a display control unit that displays the operation item for processing the case, along with the estimated completion date and/or the completion date, wherein a mark is set to emphasize the operation item if both the estimated completion date and the completion date exist and the completion date is behind the estimated completion date, and a different mark is set to emphasize the operation item if only the estimated completion date exists and the estimated completion date is earlier than current date when the operation item is checked.

8. The information processing apparatus according to claim 7, wherein the date extracting unit extracts, for the operation item, the estimated completion date or the completion date from the at least one document, based on both the type of the at least one document and updating time of the at least one document.

* * * * *